United States Patent
Jim et al.

(10) Patent No.: US 6,591,244 B2
(45) Date of Patent: Jul. 8, 2003

(54) COMPUTER METHOD AND APPARATUS FOR AUTOMATIC EXECUTION OF SOFTWARE APPLICATIONS

(75) Inventors: Parsons Jim, Sugarland, TX (US); Girish Navani, Shrewsbury, MA (US)

(73) Assignee: Aspen Technology, Inc., Cambridge, MA (US)

( * ) Notice: Subject to any disclaimer, the term of this patent is extended or adjusted under 35 U.S.C. 154(b) by 0 days.

(21) Appl. No.: 09/267,538

(22) Filed: Mar. 12, 1999

(65) Prior Publication Data

US 2002/0007298 A1 Jan. 17, 2002

Related U.S. Application Data (60) Provisional application No. 60/077,841, filed on Mar. 13, 1998.

(51) Int. Cl.$^7$ ............................................. G06F 17/60
(52) U.S. Cl. .......................................... 705/9; 345/963
(58) Field of Search ...................... 705/9, 8, 7; 345/777, 345/779, 810, 841, 963

(56) References Cited

U.S. PATENT DOCUMENTS

| | | | |
|---|---|---|---|
| 5,008,810 A | | 4/1991 | Kessel et al. ............... 364/200 |
| 5,438,659 A | | 8/1995 | Notess et al. ............... 395/155 |
| 5,530,861 A | * | 6/1996 | Daimant et al. ............ 395/650 |
| 5,666,297 A | | 9/1997 | Britt et al. .................. 364/578 |
| 5,687,090 A | | 11/1997 | Chen et al. ................. 364/496 |
| 5,884,306 A | * | 3/1999 | Bliss et al. ..................... 707/7 |
| 6,043,817 A | * | 3/2000 | Bolnick et al. ............. 345/342 |
| 6,072,486 A | * | 6/2000 | Sheldon et al. ............. 345/339 |

FOREIGN PATENT DOCUMENTS

| | | |
|---|---|---|
| WO | WO 97 07454 | 2/1997 |
| WO | WO 97 41498 | 11/1997 |

OTHER PUBLICATIONS

NetManage. ECCO Pro 4.02 User's Guide and ECCO Expert Training Session Two. NetManage, Inc. May 1997.*
Lotus. Developing Notes Applications with Lotus Components. Lotus Development Corporation, Nov. 1996, p. 35.*
Padwick, Gordon. Using Microsoft Outlook 97. Que, 1997, pp. 235–236, 584–585, 593–594.*
Microsoft. Guide to Windows NT 4.0 Profiles and Policies and XCLN: How to Manage Outlook 97 with System Policies. Microsoft Product Support Service, 1997.*
Mosele, Lonnie et al. Mastering Microsoft Office 97 Professional Edition. 1997.*
The AMR Research Alert on Manufacturing for Sep. 24, 1999.

* cited by examiner

*Primary Examiner*—Tariq R. Hafiz
*Assistant Examiner*—Dave Robertson
(74) *Attorney, Agent, or Firm*—Hamilton, Brook, Smith & Reynolds, P.C.

(57) ABSTRACT

A computer method and apparatus for automatic execution of software applications where the software applications are launched from a business terminology oriented workspace built using a business solutions framework. The framework includes the ability to define a workspace consisting of users, user types, business categories, business activities and business tasks. The workspace is presented by displaying associated business activities and the business tasks using business-oriented language and organization. A hierarchy of business categories, business activities and business tasks is also displayed in the workspace.

24 Claims, 7 Drawing Sheets

COMPUTER METHOD AND APPARATUS FOR AUTOMATIC EXECUTION OF SOFTWARE APPLICATIONS

RELATED APPLICATIONS

This application claims the benefit of U.S. Provisional Patent Application 60/077,841, filed Mar. 13, 1998, entitled "METHOD AND APPARATUS FOR AUTOMATIC EXECUTION OF SUITE APPLICATIONS AS A FUNCTION OF USER TYPE", which is assigned to the assignee of the present invention, and which is hereby incorporated by reference in its entirety.

BACKGROUND OF THE INVENTION

Software application packages provide respective solutions to improve productivity of users. The solutions of each software package are typically represented by and user enabled through a fixed series of menu options. Each of these menu options is presented in terms specific to the software package and represents a specific feature of the software. In order to be productive with the software, the users have to learn the features of the software and then decide whether the software feature will provide him/her the functionality required for the business activity at hand. Not only do the users require training of the software interface, but also of its language (terminology) and features.

In the business or work setting, for new employees, an organization will have to train the employees, not only on the organization's business activities and in the language/terminology of the specific business, but the employees will also have to be trained in the software used by the organization in the language of the software application package.

Examples of such software application packages are Lotus® SmartSuite®, Microsoft® Office, and Corel® WordPerfect® Suite. Each package provides components to do word processing, spreadsheet calculation, database processing and business graphics. Each package comes with its own, unique user interface, language/terminology and feature set that must be learned before becoming productive with the package.

SUMMARY OF THE INVENTION

Applicants have discovered that to date, there is no mechanism for translating between (i) the language/terminology and feature set of software applications and (ii) the business activities or tasks at hand for an employee/user.

Further, a problem arises with the continued changes in the software application solutions provided. As today's software application packages introduce even more new features and new language/terminology they require increased training of users. Additionally, knowing the language and feature set of one software application package for a specific task (e.g., word processing) does not necessarily mean one will be productive on a different software application package. The need for added training impacts the productivity of the users of the software.

Accordingly, the need exists for a more flexible software framework and in particular, a software package-to-business activity translator which enables needs of different business organizations to be satisfied by application software and shortens the time required for users to reach their peak productivity with the software applications packages. A software framework which presents the software capabilities in terms of focused business activities and business language (terminology) specific to the business organization reduces the need for training and increases user's productivity (including minimizing time in reaching peak productivity).

The present invention provides such a flexible software framework for use in presenting a workspace for performing a user's business activities without having to be trained on the specific features and language of the currently available software application packages. With this flexible structure, the user only needs to use the business language that its specific work force is accustomed to.

The invention framework presents a customized, flexible, workspace for users to interact with to perform business tasks. Each custom workspace is defined for a specific user or user type. The workspace consists of customizable areas, including: a title bar for displaying the name of the display, a menu bar for selecting commands (in business words/phrases familiar to the user) offered by the workspace, a tool bar for use as an alternate interface for selecting commands (in graphical representations) offered by the workspace, a business category tab bar for selecting among predefined business categories, a Tree View to display predefined business activities, a status bar receiving and providing user feedback about the operational status of the workspace, and an Information View to interact with the underlying software application package configured to perform the desired business activity.

The workspace provides a customizable two-dimensional presentation of application software for a business organization. These dimensions allow the user to group business activities together that make sense for a specific business organization. Furthermore, the language or wording used to present these business activities is in the native language/terminology of the specific business organization.

The definition of the first dimension allows the user to group business activities together (e.g., the user may choose to represent a business area or department) into business categories and name the business category.

The second dimension defines a hierarchy of business activities associated with each of the business categories defined by the first dimension. A business category is displayed as the root of all associated business activities defined.

For each user or group of users, the workspace may be defined differently to suit a specific business organization. The workspace may be customized and used to guide a specific group of users through their specific business process flows, giving them an electronic desktop with the appropriate tasks for the subject business or industry. Users of the workspace are assigned an access control privilege when the users are defined. For those users with proper access control, the content and naming of items in each area of the workspace is totally customizable.

The invention and apparatus is operating system and business organization independent. As an example, in the chemical polymer industry, the invention is delivered on a Microsoft Windows® 95 and Windows NT® platform. The invention is used in manufacturing plants to organize business activities for each specific group of users. The business categories group activities, such as: Planning and Scheduling, Production Execution, Production Accounting, Advanced Process Control and Engineering.

Within each business category, business activities are organized in a manner suitable for the business category. For example, in the Planning and Scheduling business category, business activities are grouped in a hierarchical manner, with the first sub groupings being Long Term Planning, Mid Term Planning and Scheduling.

Under each first level sub grouping, business activities are further grouped into groupings logical to the specific business organization. Elements at the lowest level of the business activity hierarchy are associated with predefined software applications, which are ultimately launched to deliver the functionality that will satisfy the user tasks defined by that business activity.

The present invention provides computer means for automatic selection and launching of one or more applications programs (i.e., business tasks) chosen from a plurality of software application packages (i.e., a so-called software "suite") depending on the user. A business task is an executable program or batch file that is able to be launched from the workspace using specific order, arguments and logon information. More specifically, the present invention recognizes and defines different types of users (i.e., user types) of the plurality of application programs. The present invention associates or corresponds each user type with an ordered subset (or sequence) of the plurality of software application package programs. The ordered subset of programs follows the typical or normal use of the respective programs for accomplishing a preestablished set of business tasks for the respective user type.

Further, the present invention provides indications of user type and respective set of business tasks, in business or industry standard terms instead of software programmer-like terminology or software applications terminology. The desired terms, user types and respective set of business tasks are user definable when installing the present invention in a desired computer system. This enhances ease of ultimate use of the plurality of application programs.

For example, in the chemical (polymer) processing industry, there are a number of application programs utilized for the design, monitoring, maintenance, simulation, etc. of a process manufacturing system. One such plurality (or suite) of application programs in the process engineering/manufacturing industry are the software application package programs manufactured by Aspen Technology, Inc., the assignee of the present invention. Those software programs include "Model Manager", "Aspen Plus", "Speed Up" and "Polymers Plus" (all trademarks of Aspen Technology, Inc., Cambridge, Mass.). See U.S. Pat. Nos. 5,008,810; 5,666,297; 5,687,090 and 6,093,211 for technical descriptions of these programs.

A design engineer of a polymer process manufacturing plant may want to use a certain subset of these programs for determining bottlenecks and proposing design solutions. On the other hand, a manager of the plant may use a different subset of these programs for projecting production, waste and inventory measurements, and so forth with other users of the programs in the subject manufacturing plant. Each of the needs of the different basic groups of similar users define a respective user type. That is, to the extent that some users'needs of the programs overlaps that of other users, a generic user type is defined.

Along with defining the user needs covered by a given user type, the ordered subset or sequence of certain ones of the Aspen Technology, Inc. application programs is determined for that user type. In particular, a stepwise pattern of use from one program module to another program module (in the same or different software application package program) is determined and associated with the user type. In this example, the design engineer user type is associated with a sequence of pertinent, respective modules from the programs "Model Manager", "Aspen Plus" and "Batch Plus", for example; and the manager user type is associated with a sequence of pertinent respective modules from "Aspen Plus" and "Polymers Plus", for example.

Lastly, in the operating system of the computer network employed by the users of the subject manufacturing plant, the present invention provides a screen view with menu selections worded "Manager Projections" and "Design/Maintenance/Monitoring", for example. This is instead of the wording used by the different programs and their respective interfaces. Further, each of these menu selections of the present invention provide a respective sub-menu listing the corresponding subset of program applications/program modules but in terms of business tasks related to that menu selection. Following the current example, the "Manager Projections" menu selection provides a sub-menu listing the business tasks of reviewing source streams, reviewing output of streams, charting the same, etc. Each of these listed business tasks corresponds to one or more modules of the Aspen Plus and Polymers Plus programs in the respective subset of application programs. Similarly, the menu selection "Design/Maintenance/Monitoring" provides a sub-menu listing the business tasks of, for example, "determining bottlenecks", "redesigning process plant", . . . , etc. Each of these sub-menu choices corresponds to one or a combination of program modules of the ordered subset of application programs (i.e., Model Manager, Aspen Plus and Batch Plus in this example) for the design engineer user type.

In response to user selection of any of the foregoing sub-menu choices/listed business tasks, the present invention software provides launching/execution of the one or combination of application program modules corresponding to and effectively supporting the sub-menu selection. Thus, the initial menu selections through the sub-menu selections provide pertinent business or industry worded choices (and not menu choices worded with the application programs naming convention), such that the menu/sub-menu selections are easily understood by the different end users.

An embodiment of the invention is a computer apparatus providing a business solutions framework comprising a configuration module for defining a workspace, including users, user types, business categories, business activities and business tasks. The invention apparatus also includes a presentation module for viewing the defined workspace including associating the business activities with the business tasks using business-oriented language, and an execution module responsive to the presentation module for launching the business tasks.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention provides a flexible software framework for use in generating and presenting a unique workspace heretofore unachieved by the prior art. The Workspace 200 (FIGS. 2a, 2b) enables a user's business activities to be performed without the user recalling (or having been trained on) the specific feature language (terminology) and protocols of the underlying software application packages. In effect, the present invention framework provides a software package-to-business activity translator.

Figure 1:
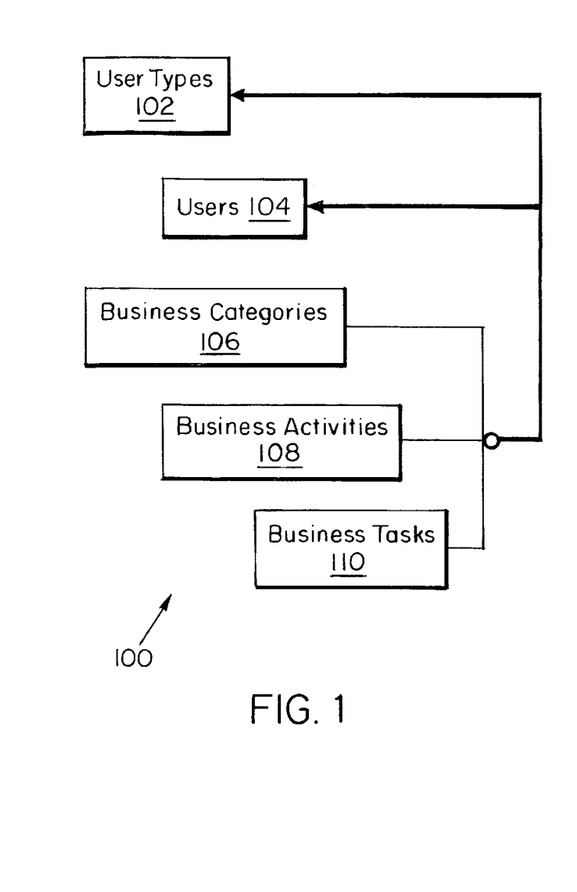
FIG. 1 illustrates a configuration of the objects that form the framework of the present invention.

In the preferred embodiment, the framework is formed of user objects and business objects as detailed in FIG. 1.

Figure 2A:
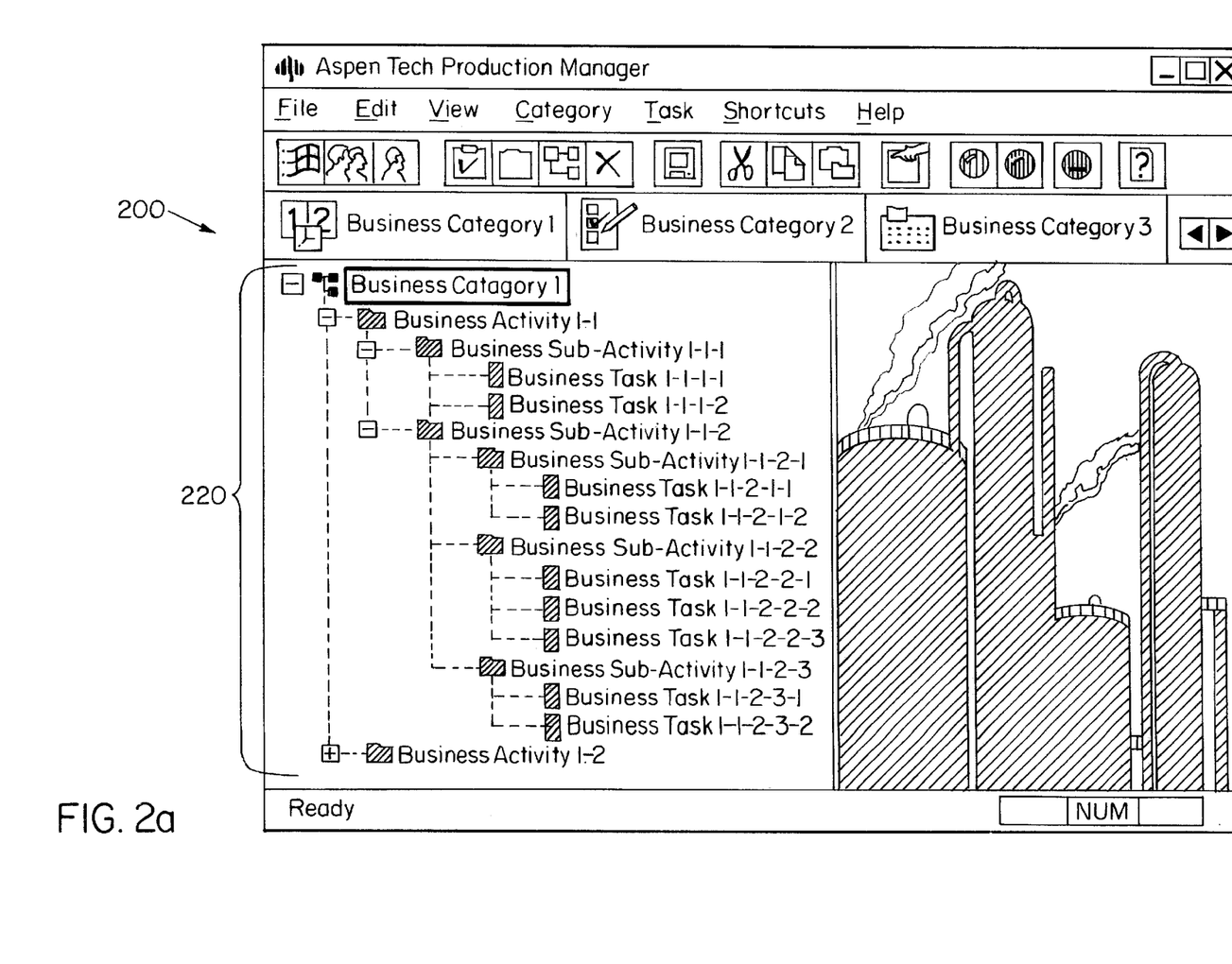
FIG. 2a illustrates a generic workspace created using the framework of FIG. 1, including an illustration of the hierarchical Tree View of the present invention.

FIG. 1 illustrates a configuration of the Framework objects 100 of the present invention. The User Types object 102 defines different types of users of the Workspace 200 (FIG. 2a). The User Types object 102 groups users of Users object 104 together to provide specific groups of users access to specific business process flows. Users 104 inherit the attributes of the User Type 102 that they are grouped with. Both User Types 102 and Users 104 have attributes defined that provide an access control privilege to control the level of customization that Users 104 are allowed to use when configuring the Workspace 200.

The Business Categories object 106 defines one or more areas (e.g., business areas or departments) that organizes related Business Activities 108 in a manner suitable to the specific Business Categories object 106. Thus, the Business Categories object 106 holds one or more working Business Categories 106. The Business Categories object 106 is the root of all associated Business Activities 108 defined.

The Business Activities object 108 defines a set of related tasks from groupings logical to a specific business organization. Each grouping or set of related tasks is able to be further grouped into sub-groups to form a hierarchy. The Business Activities 108 are linked to the Business Categories 106. That is, one or more business activities 108 are associated with one or more Business Categories 106. Restated, each business category 106 is formed of one or more Business Activities 108.

The Business Tasks object 110 defines executable programs or batch files that are able to be launched from the Workspace 200 using specific order, arguments and logon information to perform specific business functions. The Business Tasks 110 are linked to the Business Activities 108. In particular, each business activity in Business Activity object 108 is defined by a set of Business Tasks 110 through the link between Business Task object 110 and Business Activity object 108. The linking of Business Tasks 110 to Business Activities 108 and Business Activities 108 to Business Categories 106 forms a hierarchy that is represented in the Tree View 220 of Workspace 200 (FIG. 2b).

User Types 102 and Users 104 are associated with an ordered subset of the plurality of Business Categories 106, Business Activities 108 and Business Tasks 110. This ordered subset follows a typical or normal use for accomplishing a pre-established set of business tasks for the respective user type.

FIG. 2a illustrates a generic Workspace 200 created using the present invention Framework objects 100 (FIG. 1). The hierarchy formed by the linking of Business Categories 106, Business Activities 108 and Business Tasks 110 is illustrated by the hierarchical Tree View 220.

Figure 2B:
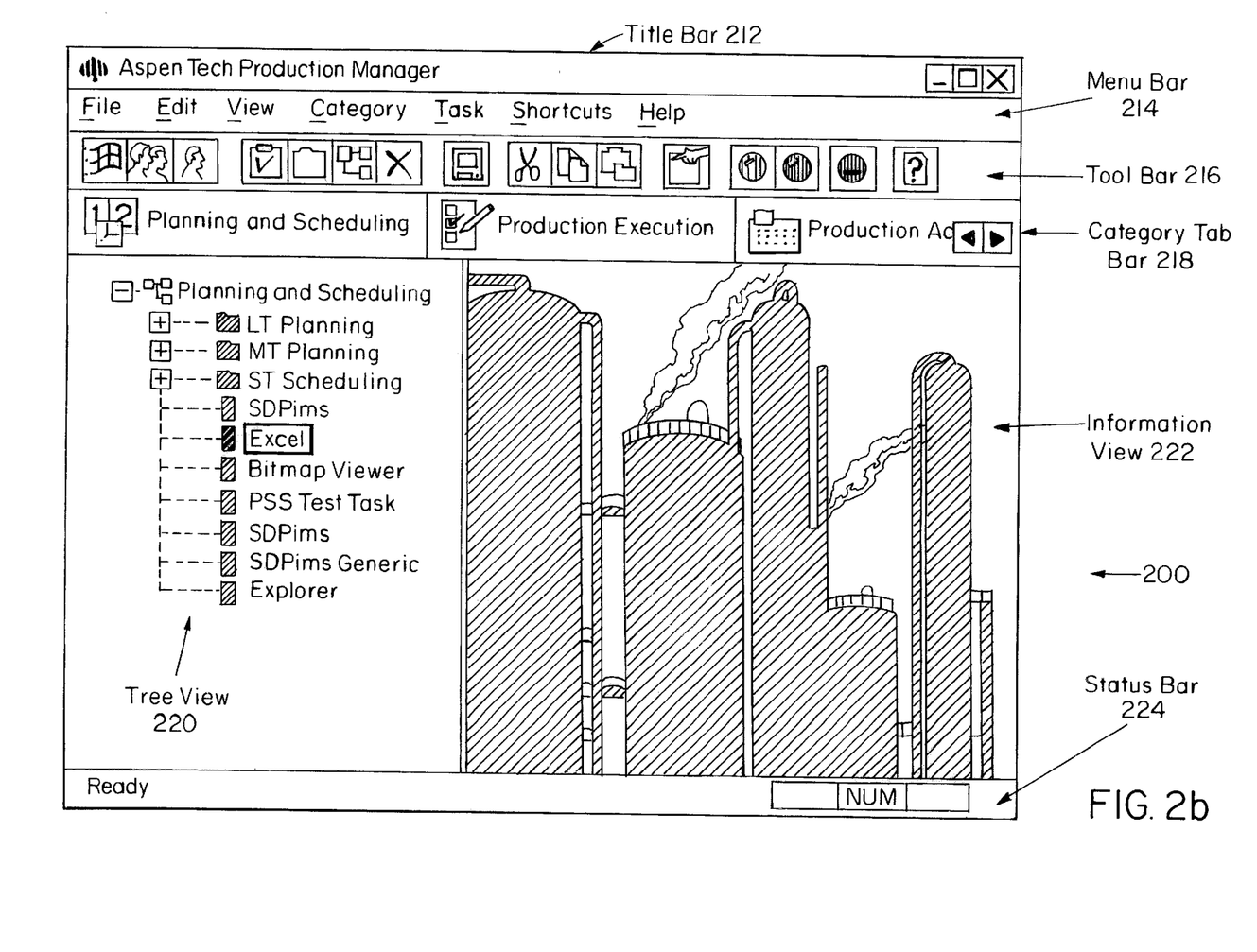
FIG. 2b illustrates an example workspace created using the framework of FIG. 1, highlighting various presentation aspects of the workspace.

FIG. 2b illustrates another new Workspace 200 created using the Framework objects 100 (FIG. 1). The Workspace 200 includes a Title Bar 212 for naming the Workspace 200. A Menu Bar 214 is provided to present commands (in business terminology) used to manipulate the Workspace 200. As an alternate interface, a Tool Bar 216 uses graphical representations to present user-selectable commands offered by the Workspace 200. A Category Tab Bar 218 is presented for viewing among predefined business categories in wording familiar to that business industry. The major portion of the display area of the Workspace 200 is divided into two parts, the Tree View 220 and the Information View 222. The Tree View 220 is an area of the Workspace 200 for displaying the hierarchy representing the Business Categories 106, Business Activities 108 and Business Tasks 110 associations. The Information View 222 is an area of the Workspace 200 for displaying input and output from the Business Tasks 110 as they are executed. An alternate representation of the Business Tasks 100 input and output is achieved by creating a separate window, outside of the Workspace 200. A Status Bar 224 uses graphical representation and text to receive and provide user feedback about the operational status of the Workspace 200.

Figure 3:
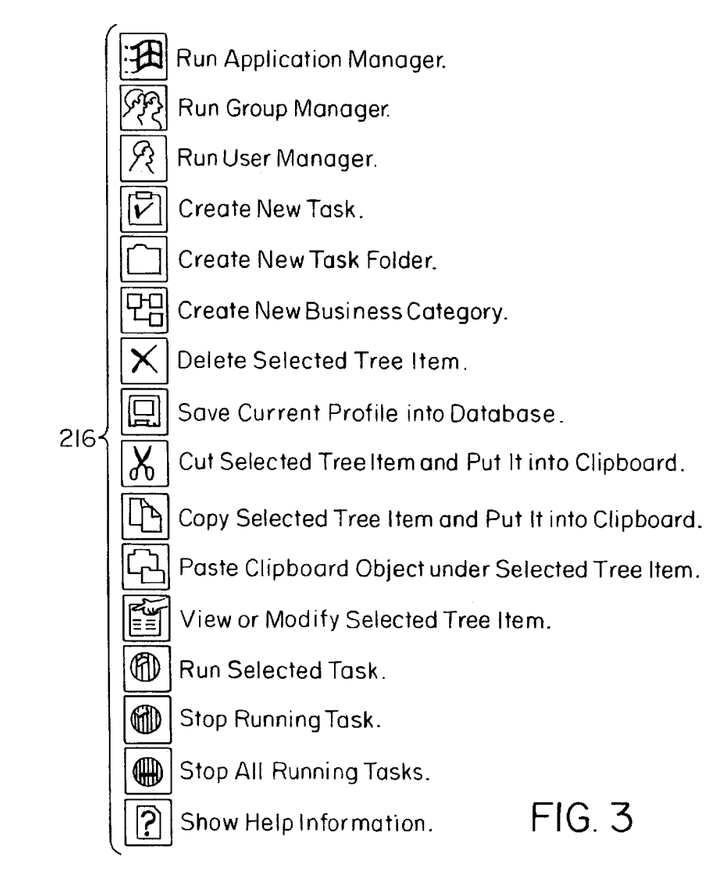
FIG. 3 illustrates a toolbar created using the framework of FIG. 1.

FIG. 3 illustrates one version of Tool Bar 216 of the Workspace 200 showing various graphical representations of commands offered by the Workspace 200. These graphical representations of commands are able to be activated by the user and serve as shortcuts to selected commands offered by the Workspace 200, including commands to configure and run the Workspace 200.

Figure 4:
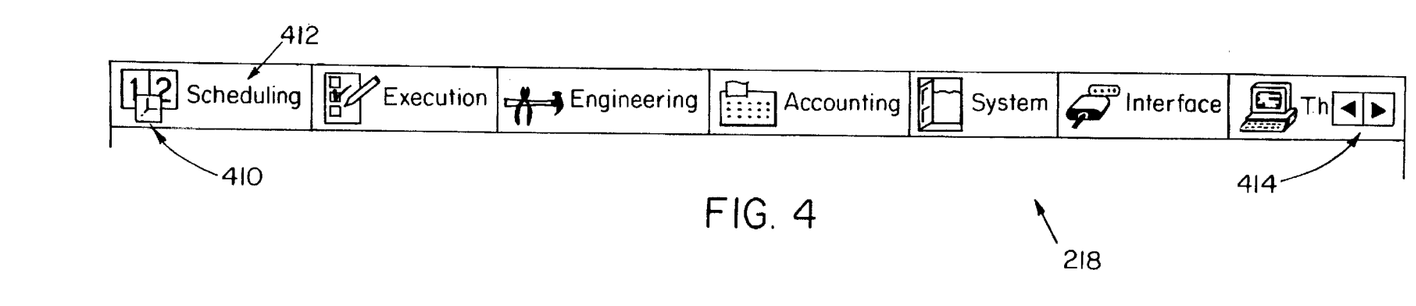
FIG. 4 illustrates a category tab bar created using the framework of FIG. 1.

FIG. 4 illustrates one version of the Category Tab Bar 218 used to present predefined business categories. Both graphical representations 410 and text 412 are used to guide the user to the proper business category. The text is in wording or terminology familiar to the user's business rather than in terms of software applications packages. The Category Tab Bar 218 provides scrolling via Navigation Keys 414. The Navigation Keys (e.g, left and right arrow provides scrolling via Navigation Keys 414. The Navigation Keys (e.g, left and right arrow heads, and the like) 414 can be used when more business categories are defined than can be displayed simultaneously in the Workspace 200.

Figure 5:
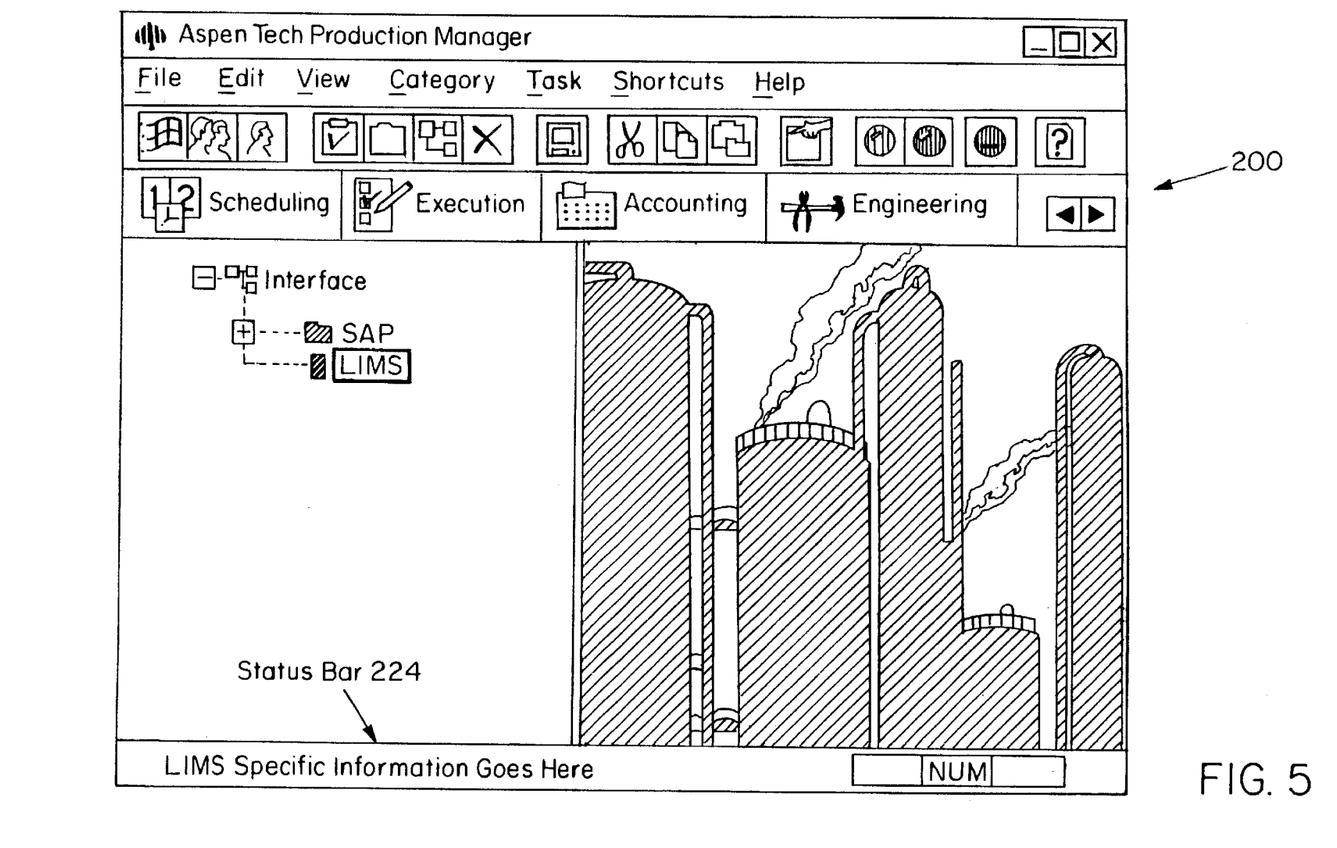
FIG. 5 illustrates a status bar created using the framework of FIG. 1.

FIG. 5 illustrates a Status Bar 224 for receiving and providing user feedback about the operational status of the Workspace 200 as well as information specific to the business task being executed. For example, a business task might display help text designed to assist a user in working with the specific business task or what mode the business task is currently operating in. Additionally, status information about the Workspace 200 environment itself, such as, whether Num Lock or Caps Lock is on may be displayed at 224. The Status Bar 224 is also an alternate interface to issue commands to the Workspace 200, such as changing Printer settings.

Figure 6:
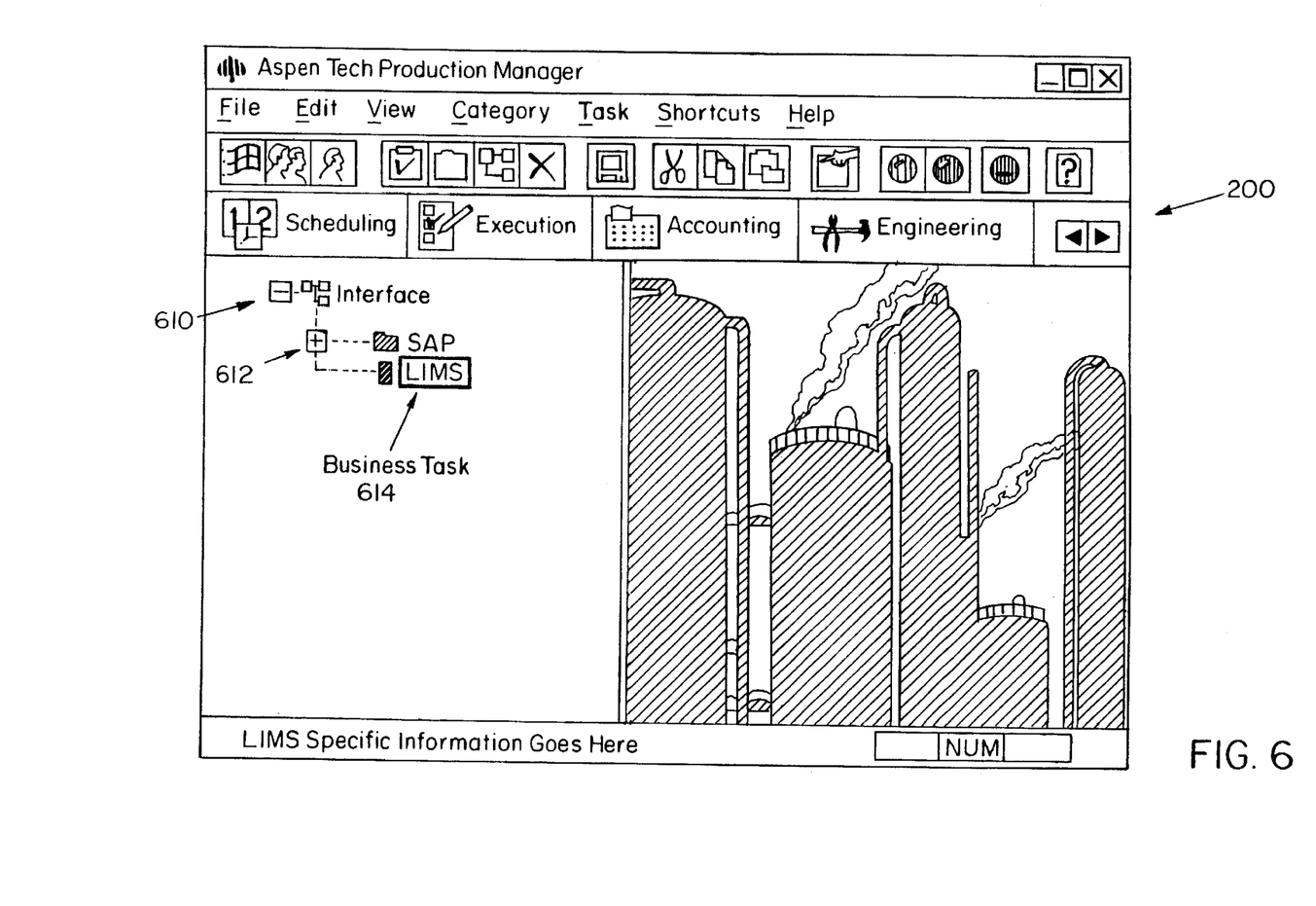
FIG. 6 illustrates the hierarchical relationship between business categories, business activities and business tasks of the workspace of FIGS. 2a and 2b.

FIG. 6 illustrates the hierarchical relationship between business categories, business activities and business tasks of the Workspace 200 as shown in FIGS. 2a and 2b. A business category graphical representation 610 is displayed as the root of the hierarchy, under which a business activity graphical representation 612 is displayed. That Business Activity 612 thus serves to define the displayed Business Category 610. Although only one Business Activity 612 is displayed, it is understood that a plurality of different business activities may define the displayed Business Category 610 and likewise be hierarchically represented and displayed.

A business task graphical representation 614 is displayed as a terminal node in the hierarchy. The Business Task 614 defines the Business Activity 612 under which the task is displayed. Activation of the business category graphical representation 610 and the business activity graphical representation 612 changes the view of the Workspace 200. The activation either expands or collapses the amount of the view that the user sees. Activation of the business task graphical representation 614 launches the software applications modules supporting the business task associated with the business task graphical representation 614.

Although only one Business Task 614 is illustrated, it is understood that several different Business Tasks 614 may similarly be displayed under respective business activities displayed in Workspace 200.

Figure 7:
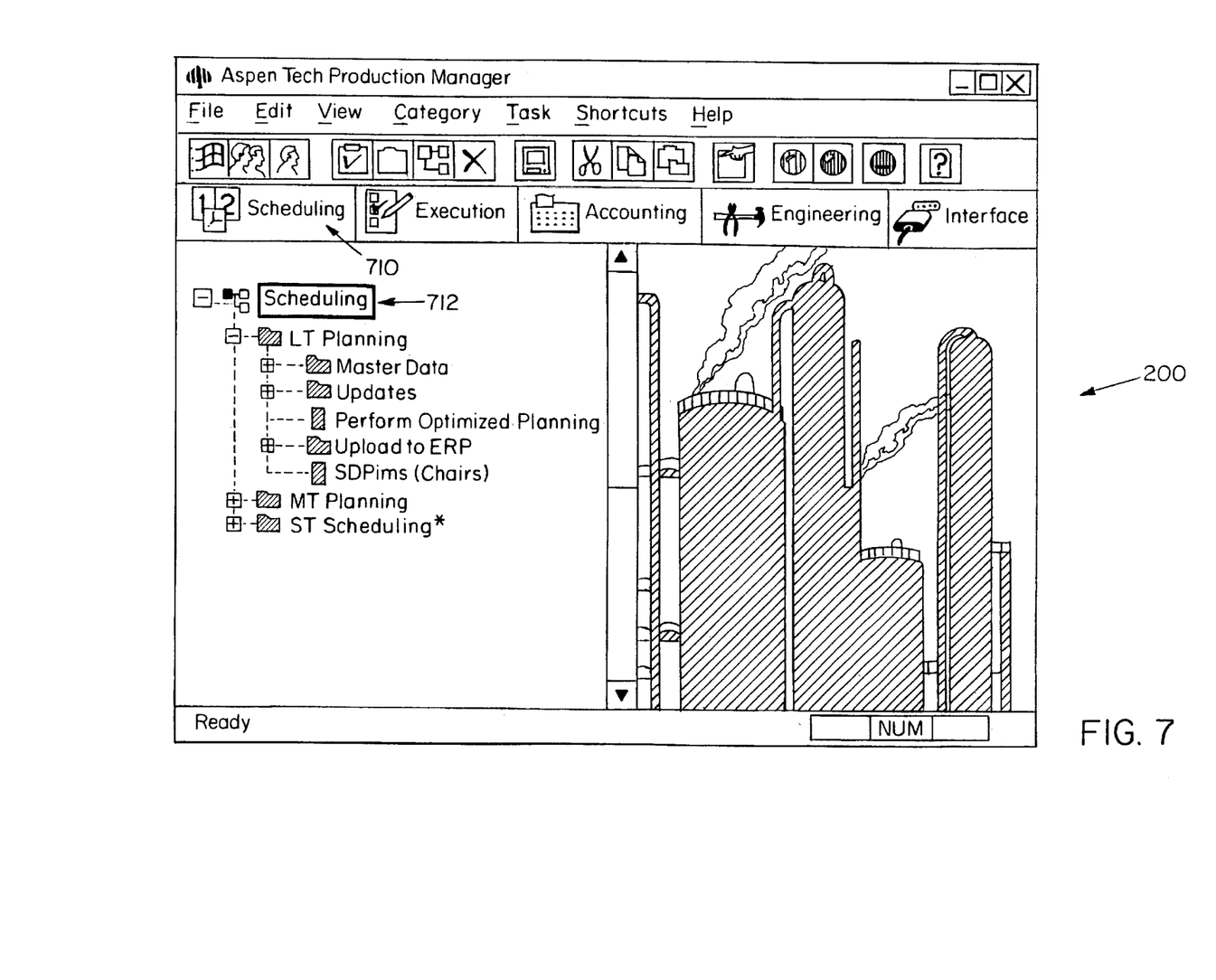
FIG. 7 illustrates the dual representation of a business category as a category tab and as a root folder.

FIG. 7 illustrates the dual display capability of the Workspace 200 for showing the business category graphical representation 710 in the category tab bar 218 as well as showing the business category graphical representation 712 in the tree view 220. Either representation enables a user to navigate through the specific business category corresponding to the graphical representations 710, 712. The currently selected business category is displayed as the root of the tree view 220.

The Business Categories objects 106, Business Activities objects 108 and Business Task objects 110 of FIG. 1 define and support the members and hierarchies of the category tab bar 218 and the tree view 220. That is, each business category 106 of Business Category object 106 (FIG. 1) is graphically represented, one after the other, in respective areas spaced horizontally across the category tab bar 218. Similarly, each of the same business categories 106 has a respective hierarchy tree illustrated in the tree view 220 upon user selection of that business category 106. Selection is made by the user moving the cursor to the corresponding area/graphical representation on the category tab bar 218, or by the user navigating through a pull down menu from the "category" position labeled on menu bar 214 (FIG. 2b). That pull down menu presents names of business categories and hence is in business terminology familiar to the user.

Further, the linking of Business Activities 108 from business activity object 108 to a corresponding Business Category 106 in Business Category object 106 (FIG. 1), supports and defines the listing of the respective business activity graphical representations 612 in a common level in the tree view 220. This linking also supports the dual display capability of FIG. 7.

In the same light, the Business Activities object 108 and Business Tasks objects 110 of FIG. 1 define and support the sub-members and lower level portions (and further embedded) portions of the hierarchies of the tree view 220. That is, each Business Activity object 108 is indicated by a respective business activity graphical representation 612 (FIG. 6) and each Business Task object 110 is indicated by a respective business task graphical representation 614 (FIG. 6) in tree view 220. The linking of business tasks 110 from Business Task object 110 to a corresponding Business Activity 108 on Business Activity object 108 (FIG. 1), supports and defines the listing of the specific business tasks graphical representations 614 in a common level in the tree view 220. This linking also supports the pull down menu displayed from the "task" position labeled on menu bar 214 (FIG. 2b).

Similarly, the linking of various sets and subsets of Business Categories 106, Business Activities 108 and Business Tasks 110 to a user of User object 104 and/or a User Type 102 (FIG. 1) defines and supports the category tab bar 218, category and task pull down menus from menu bar 214, and tree view 220 per user. That is, the linking of the objects 102, 104, 106, 108, 110 in the framework 100 specifies the menu bar 214 pull down menu selection options, the graphical representations displayed in category tab bar 218 and the hierarchy in tree view 220, for each given user.

Figure 8:
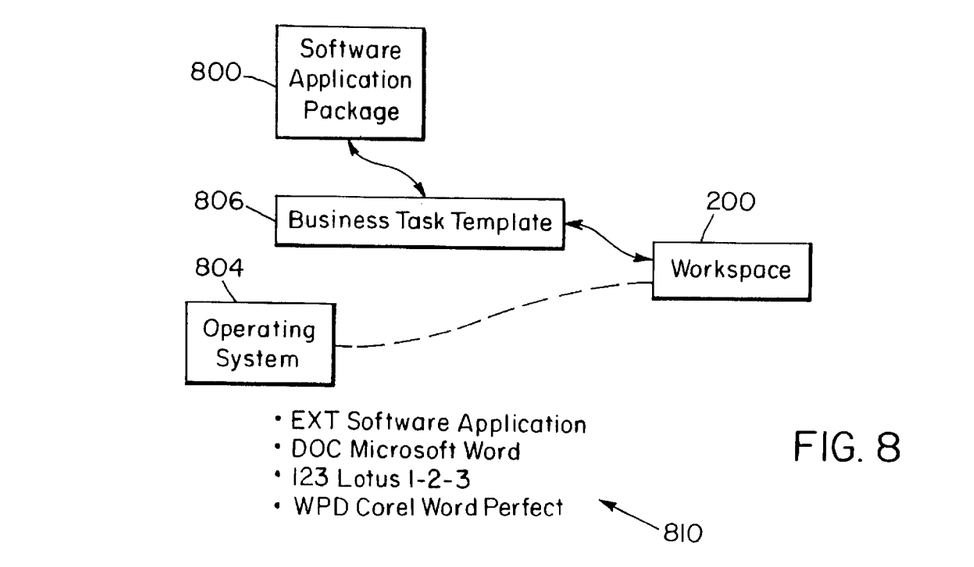
FIG. 8 is a schematic illustration of the invention launching business tasks from the workspace.

FIG. 8 illustrates the process of launching business tasks from the Workspace 200. A Software Application Package 800 is used to form a business specific task by creating a Business Task Template 806. The Business Task Template 806 is an Operating System 804 file with a filename and extension (.EXT). The Operating System 804 associates at 810 a specific extension with a specific Software Application Package 800. Thus the Workspace 200 opening such a file/template 806 with a specific extension will launch the Software Application Package 800 associated with that file/template 806. The Workspace 200 opens a specific Business Task Template 806 using the above-described business-terminology oriented interface of FIGS. 2a–7 presented by the Workspace 200. In turn, this launches the Application Software Package 800 that the Task Template 806 and the Workspace 200 has associated with the business activity the user desires to perform.

Although only one business task template 806 and corresponding software application package 800 is illustrated in FIG. 8, it is understood that for each Business task 110 in the invention Workspace 200, there is a business task template 806 and one or more (e.g., a series of) corresponding software application module 800 configured as described in FIG. 8.

When a Business Task 110 is selected by the user through the Workspace 200 interface (i.e., navigating through the menu bar 213 "task" label, the category tab bar 218 or the tree view 220 to the menu selection or graphical representation of the desired business task 110), the corresponding software application package or module (or series of such modules/programs) 800 is launched through the corresponding business task template 806. The operating system 804 through the extensions 810 employed provide proper pointers and initialization for the launched application programs/modules 800 using techniques common in the art. Thereafter, the user is able to operate within the launched application programs 800 to complete his task (business task) and return to the Workspace 200 upon completion of the Business Task 110.

As such the present invention provides a computer method and apparatus for enabling users to select and launch applications programs in terms of business tasks, business activities and business categories and without conscious use of application programs terms and protocols. To that end, a user does not need to be trained on various applications programs and is able to accomplish business tasks using terminology familiar to him in a computer workspace of the present invention.

While this invention has been particularly shown and described with references to preferred embodiments thereof, it will be understood by those skilled in the art that various changes in form and details may be made therein without departing from the spirit and scope of the invention as defined by the appended claims.

Attached as Appendix I is a particular embodiment of a Business Process Explorer™ workspace created using the framework of the present invention.

The windows of the workspace created using the framework of the present invention are shown using a Single Document Interface (SDI) in the presented examples. The present invention is not limited to SDI windows; for example, a Multiple Document Interface (MDI) is possible.

Although Business Tasks are launched in the example presented through the use of templates, the invention is not limited to launching via templates. Applications can be launched directly without templates (e.g., Microsoft Explorer).

What is claimed is:

1. A computer apparatus providing a process engineering computer program execution framework comprising:
   a configuration module for defining a workspace, including users, user types, process engineering business categories, process engineering business activities and process engineering business tasks, the configuration module further comprising:
      a process engineering business category module for specifying the process engineering business categories and associating the process engineering business categories with the process engineering business activities, such that a hierarchy is formed of the process engineering business categories, the process engineering business activities and the process engineering business tasks;
      a process engineering business task module for defining the process engineering business tasks using a process engineering business task template, the process engineering business task template providing forte definition of process engineering task configuration information and process engineering task argument information;
   a presentation module for viewing the defined workspace including associating the process engineering business activities with the process engineering business tasks using non-engineering terminology, the presentation module further comprising:
      a category tab bar module for presenting a graphical representation of the process engineering business categories, the category tab bar being a root of the hierarchy formed of the process engineering business categories, the process engineering business activities and the process engineering business tasks, and
      a workspace module for presenting a tree view and an information view within a single document window;
   an execution module responsive to the presentation module for launching the process engineering business tasks; and
   wherein at least one of the process engineering business tasks access a process engineering computer program to perform process modeling, simulation or optimization, the process engineering computer program executing within the information view of the defined workspace.

2. The computer apparatus of claim 1 wherein:
   the configuration module further comprises:
      a user module for specifying the users;
      a user type module for specifying the user types, associating the user types with a plurality of the users, and associating the user types with a plurality of the business categories, business activities and business tasks;
      a business task module for defining the business tasks;
      a business activity module for specifying the business activities and associating the business activities with a plurality of the business tasks or other of the business activities; and
      a business category module for specifying the business categories and associating the business categories with the business activities, such that a hierarchy is formed of business categories, business activities and business tasks.

3. The computer apparatus of claim 2 wherein:
   the presentation module further comprises:
      a tab bar module for presenting a graphical representation of the business categories;
      a tree module for presenting a hierarchical view of the business categories, the business activities and the business tasks;
      an information module for presenting input and output from the business tasks;
      a status bar module for providing information specific to the business task, including indications of current operational status and device status;
      a menu module for presenting a command interface to the workspace;
      a tool bar module providing graphical representations that are used as shortcuts to the command interface; and
      a title bar module to enable naming the workspace.

4. The computer apparatus of claim 2 wherein:
   the user module for specifying users and the user type module for specifying user types provide attributes, definable for each user and user type, that control access to the customize ability of the workspace.

5. The computer apparatus of claim 3 wherein:
   the business categories are displayed using graphical representations of the business categories, oriented on a horizontal dimension.

6. The computer apparatus of claim 3 wherein:
   the hierarchical view is displayed using graphical representations of the business categories, the business activities and the business tasks, oriented on a vertical dimension.

7. The computer apparatus of claim 3 wherein:
   the business categories are displayed using graphical representations of the business categories, oriented on a horizontal dimension; and
   the hierarchical view is displayed using graphical representations of the business categories, the business activities and the business tasks, oriented on a vertical dimension.

8. The computer apparatus of claim 3 wherein:
   the business tasks are formed from commercial or customized software applications and templates capable of performing a desired function, including applications that will execute in a window within the workspace as well as applications that will execute in a window separate from the workspace.

9. A method of providing a process engineering computer program execution framework comprising the steps of:

(a) configuring a workspace, including defining users, user types, process engineering business categories, process engineering business activities and process engineering business tasks, and associating the process engineering business categories with the process engineering business activities and associating the process engineering business activities with the process engineering business tasks, such that a hierarchy is fanned of the process engineering business categories, the process engineering business activities and the process engineering business tasks, the process engineering business categories, the process engineering business activities and the process engineering business tasks being configurable using non-engineering terminology;

(b) defining the process engineering business tasks using a process engineering business task template, the process engineering business task template providing for the definition of process engineering task configuration information and process engineering task argument information;

(c) presenting the defined workspace including associating the defined process engineering business activities with the defined process engineering business tasks using non-engineering terminology, and presenting a graphical representation of the process engineering business categories using a category tab bar being a root of the hierarchy formed of the process engineering business categories, the process engineering business activities and the process engineering business tasks, the defined workspace including a tree view and an information view within a single document window;

(d) executing the defined process engineering business tasks; and wherein at least one of the process engineering business tasks access a process engineering computer program perform process modeling, simulation or optimization, the process engineering computer program executing within the information view of the defined workspace.

10. The method of claim 9 wherein the step of configuring a workspace further includes the steps of:

(a) specifying the users;

(b) creating the user types, associating the user types with a plurality of the users, and associating the user type with a plurality of the business categories, business activities and business tasks;

(c) forming the business tasks;

(d) specifying the business activities and associating the business activities with a plurality of the business tasks or other of the business activities; and (e) specifying the business categories and associating the business categories with the business activities, such that a hierarchy is formed of business categories, business activities and business tasks.

11. The method of claim 9 wherein the step of presenting the defined workspace further includes the steps of:

(a) presenting a graphical representation of the business categories;

(b) presenting a hierarchical view of the business categories, the business activities and the business tasks;

(c) presenting input and output from the business tasks;

(d) presenting information specific to the business task, including indications of current operational status and device status;

(e) presenting a command interface to the workspace;

(f) presenting graphical representations that are used as shortcuts to the command interface; and (g) presenting a name for the workspace.

12. The method of claim 10 wherein the steps of specifying the users and creating the user types further include the step of:

providing attributes, definable for each of the users and the user types, such that control access to the customizeability of the workspace is achieved.

13. An article of manufacture comprising a computer usable medium having computer readable program code means embodied therein for providing a process engineering computer program execution framework comprising the steps of:

(a) configuring a workspace, including defining users, user types, process engineering business categories, process engineering business activities and process engineering business tasks, and associating the process engineering business categories with the process engineering business activities and associating the process engineering business activities with process engineering business tasks, such that a hierarchy is formed of the process engineering business categories, the process engineering business activities and the process engineering business tasks, the process engineering business categories, the process engineering business activities and the process engineering business tasks being configurable using non-engineering terminology;

(b) defining the process engineering business tasks using a process engineering business task template, the process engineering business task template providing for the definition of process engineering task configuration information and process engineering task argument information;

(c) presenting the defined workspace including associating the defined process engineering business activities with the defined process engineering business tasks using non-engineering terminology, and presenting a graphical representation of the process engineering business categories using a category tab bar being a root of the hierarchy formed of the process engineering business categories, the process engineering business activities and the process engineering business tasks, the defined workspace including a tree view and an information view within a single document window;

(d) executing the defined process engineering business tasks; and wherein at least one of the process engineering business tasks access a process engineering computer program to perform process modeling, simulation or optimization, the process engineering computer program executing within the information view of the defined workspace.

14. The article of manufacture claim 13 wherein the step of configuring a workspace further includes the steps of:

(a) specifying the users;

(b) creating the user types, associating the user types with a plurality of the users, and associating the user type with a plurality of the business categories, business activities and business tasks;

(c) forming the business tasks;

(d) specifying the business activities and associating the business activities with a plurality of the business tasks or other of the business activities; and (e) specifying the business categories and associating the business categories with the business activities, such that a hierarchy is formed of business categories, business activities and business tasks.

15. The article of manufacture claim 13 wherein the step of presenting the defined workspace further includes the steps of:
(a) presenting a graphical representation of the business categories;
(c) presenting information specific to the business task, including indications of current operational status and device status;
(d) presenting a command interface to the workspace;
(e) presenting graphical representations that are used as shortcuts to the command interface; and
(f) presenting a name for the workspace.

16. A method of providing a process engineering computer program execution framework comprising the steps of:
(a) configuring a workspace, including defining users, user types, process engineering business categories, process engineering business activities and process engineering business tasks;
(b) defining the process engineering business tasks using a process engineering business task template, the process engineering business task template providing for the definition of process engineering task configuration information and process engineering task argument information;
(c) presenting the defined workspace including associating the defined process engineering business activities with the defined process engineering business tasks using non-engineering terminology, the defined workspace including a tree view and an information view within a single document window; and
(d) executing the defined process engineering business tasks;
wherein the process engineering business categories comprise: Planning and Scheduling, Production Execution, Production Accounting, Advanced Process Control and Engineering;
wherein the process engineering business activities comprise: Long Term Planning, Mid Term Planning and Scheduling, the process engineering business activities each associated with a plurality of the process engineering business categories;
wherein the process engineering business tasks comprise: model management and polymer analysis, the business tasks each associated with a plurality of the business activities;
wherein the process engineering business tasks are formed from commercial or customized software applications and the process engineering business task template capable of performing a desired function; and
wherein at least one of the process engineering business tasks access a process engineering computer program to perform process modeling, simulation or optimization, the process engineering computer program executing within the information view of the defined workspace.

17. The apparatus of claim 1 wherein the business task template further provides for the definition of task logon information.

18. The method of claim 9 wherein the business task template further provides for the definition of task logon information.

19. The article of manufacture of claim 13 wherein the business task template further provides for the definition of task logon information.

20. A method for executing a process engineering computer program, comprising the steps of:
(a) providing a window having a category tab bar, a tree view and an information view, the category tab bar being linked to the tree view, and the information view providing for interaction with a process engineering computer program;
(b) presenting a workspace within the tree view defining a hierarchical representation of a configurable process engineering business category, a configurable process engineering business activity and a configurable process engineering business task, the configurable process engineering business category, the configurable process engineering business activity and the configurable process engineering business task being configurable using non-engineering terminology;
(c) defining the category tab bar such that a category tab in the category tab bar corresponds to a root of the hierarchy representation formed of the configurable process engineering business category, the configurable process engineering business activity and the configurable process engineering business task; and
wherein at least one instance of the configurable process engineering business category, the configurable process engineering business activity and the configurable process engineering business task is predefined by the workspace such that upon selection of the configurable process engineering business task, a process engineering business task template providing for the definition of process engineering business task configuration information and process engineering business task argument information is invoked to launch and execute the process engineering computer program to perform process modeling, simulation or optimization within the information view of the defined workspace to perform process modeling, simulation or optimization.

21. The method of claim 20 wherein the process engineering computer program comprises an expert system to prevent overspecification and logically inconsistent specification of a process and the modeling performed by the process engineering computer program creates a flow sheet model.

22. The method of claim 20 wherein the process engineering computer program comprises a sequential modular simulation routine and a separate optimization routine used in the modeling performed by the process engineering computer program.

23. The method of claim 20 wherein the modeling performed by the process engineering computer program comprises a polymer characterizing simulation process to obtain thermo-physical property calculations and polymerization kinetics.

24. The method of claim 20 wherein the modeling performed by the process engineering computer program comprises tracking instantaneous property measures to calculate full polymer property distributions.

* * * * *

UNITED STATES PATENT AND TRADEMARK OFFICE
CERTIFICATE OF CORRECTION

PATENT NO.    : 6,591,244 B2
DATED         : July 8, 2003
INVENTOR(S)   : Parsons Jim and Girish Navani It is certified that error appears in the above-identified patent and that said Letters Patent is hereby corrected as shown below:

Column 9,
Line 39, delete "forte" and insert -- for the --.

Column 11,
Line 8, delete "fanned" and insert -- formed --.

Column 13,
After line 9, insert
-- (b) presenting a hierarchical view of the business categories, the business activities and the business tasks; --

Signed and Sealed this

Twenty-fifth Day of November, 2003

JAMES E. ROGAN
*Director of the United States Patent and Trademark Office*